June 24, 1958 — D. CAUTHEN — 2,840,334
TRIPOD AND CAMERA INTERCONNECTING HEAD
Filed March 4, 1954
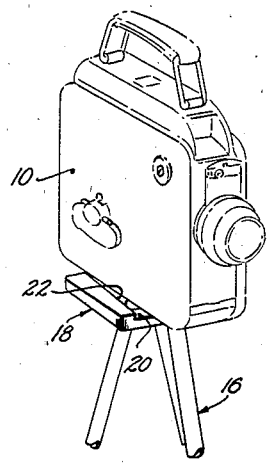
Fig. 1.
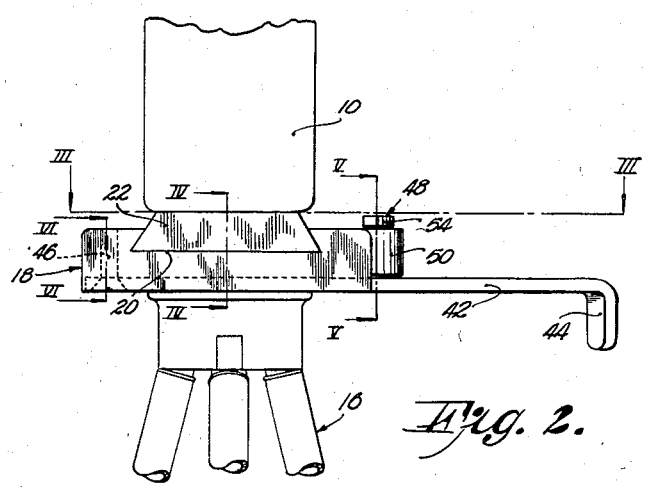
Fig. 2.
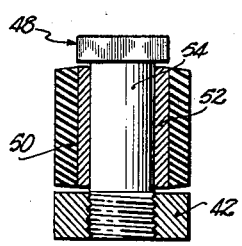
Fig. 5.
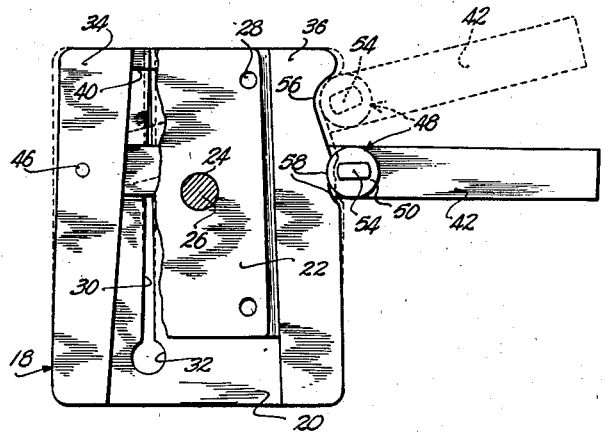
Fig. 3.
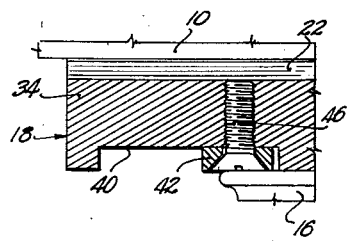
Fig. 6.
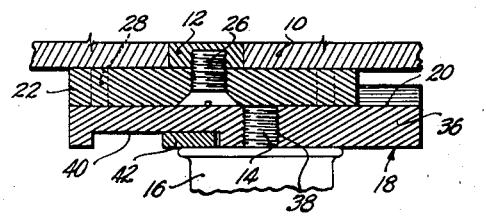
Fig. 4.
INVENTOR.
David Cauthen
BY
ATTORNEY.

United States Patent Office 2,840,334
Patented June 24, 1958

2,840,334

TRIPOD AND CAMERA INTERCONNECTING HEAD

David Cauthen, Prairie Village, Kans.

Application March 4, 1954, Serial No. 414,149

2 Claims. (Cl. 248—187)

This invention has to do with a mounting head particularly adapted for quick and simple attachment and release of camera to tripods, the primary object being to provide for a pair of mating members adapted for attachment to the camera and to the tripod respectively, and including a novel lock to hold the members against relative movement.

It is the most important object of the present invention to provide a mounting head of the aforementioned character that includes a spring plate having means for receiving a bar, together with latch means in the nature of a swingable lever for squeezing the spring plate tightly against the bar through use of cam means between the lever and one edge of the spring plate.

Another object of this invention is the provision of a mounting head that includes a split spring plate having a pair of legs movable toward and away from each other, together with a lever swingable on the spring plate and engageable with one edge thereof to clamp the legs tightly against the bar which the plate receives.

Other important objects include the way in which a dove-tail construction is used to interfit the bar and the spring plate; the manner of providing a tapered groove for receiving the bar that is similarly shaped; the way in which the aforementioned cam means includes a projection on the lever and a cam edge of the spring plate; and the way in which the said projection preferably takes the form of a resilient roller.

In the drawing:

Figure 1 is a fragmentary, perspective view of a tripod having a camera mounted thereon through use of the interconnecting head forming the subject matter of the present invention.

Fig. 2 is an enlarged, fragmentary, front elevational view thereof.

Fig. 3 is a cross-sectional view taken on line III—III of Fig. 2.

Fig. 4 is a fragmentary, detailed, cross-sectional view taken on line IV—IV of Fig. 2.

Fig. 5 is a cross-sectional view still further enlarged and taken on line V—V of Fig. 2; and Fig. 6 is a fragmentary, cross-sectional view further enlarged and taken on line VI—VI of Fig. 2.

The camera chosen for illustration of the principles of the present invention and broadly designated by the numeral 10 has, as is true of most modern-day camera, means in the nature of a tapped plug or the like 12 for receiving a threaded stud 14 forming a part of a tripod 16.

It can well be appreciated that threading of the plug 12 of camera 10 on the stud 14 each time the camera is to be mounted on the tripod 16, is inconvenient and time-consuming. The mounting head about to be described has been especially designed so as to utilize the plug 12 and the stud 14, but at the same time permit quick and ready mounting and release of the camera 10 relative to the tripod 16. At the same time, the interconnecting head shown in the drawing, is fully capable of rigidly and firmly holding the camera 10 in place on the tripod 16 without danger of accidental displacement.

To this end, there is provided a spring plate broadly designated by the numeral 18 and provided with a groove 20 that is adapted to receive an elongated bar 22. The longitudinally extending groove 20 in plate 18 is substantially V-shaped and dove-tail in cross-section as shown in Figs. 3 and 2 respectively, bar 22 being therefore, similarly shaped to mate complementally with the groove 20.

The uppermost and lowermost faces of the bar 22 are preferably flat and a central opening 24 therein receives a fastener 26 screw threaded into the plug 12 as best seen in Fig. 4, serving therefore, to mount the bar 22 to the camera 10. If desired, the bar 22 may be more permanently secured to the camera 10 by fastening elements (not shown) passing through a plurality of holes 28 provided in the bar 22.

Plate 18 is split as at 30 from one end thereof toward an opening 32, presenting a pair of legs 34 and 36 movable toward and away from each other by virtue of the inherent resiliency of the material from which plate 18 is made.

A tapped opening 38 in leg 36 of plate 18, receives the stud 14 of tripod 16 as shown in Fig. 4. Plate 18 is also provided with a transverse groove 40 that clears an elongated L-shaped lever 42 having a downturned fingerpiece 44 at its outermost free end. Lever 42 is pivotally mounted on the leg 34 of plate 18 by use of a fastener 46 as best seen in Fig. 6.

Cam means between the lever 42 and the leg 36 squeezes the legs 34 and 36 tightly against the longitudinal edges of bar 22 when lever 42 is swung to the full line position shown in Fig. 3. To this end there is provided an upstanding projection 48 on the lever 42 taking the form of a roller 50 of resilient material such as rubber, surrounding a sleeve 52 that is in turn rotatable on a stud 54 secured to lever 42 as best seen in Fig. 5.

Cooperating with the roller 50 is a cam edge on the leg 36 of plate 18 having an indentation 56 for receiving roller 50 when the lever 42 is swung to the released position as shown by dotted lines in Fig. 3. The cam edge is provided also with a plurality of indentations 58, one of which receives the roller 50 when lever 42 is swung to the locked position shown by full lines in Fig. 3.

It can now be seen that it is unnecessary to rotate the camera 10 in order to release it from the tripod 16 as has heretofore been required, since a quick and simple snapping of the lever 42 to the dotted line position shown in Fig. 3 where roller 50 rests in indentation or concavity 56, permits the legs 34 and 36 of plate 18 to spring apart. Thereupon, camera 10 may be shifted rectilinearly toward the widest end of the groove 20, thereby slipping the bar 22 out of the groove 20. Conversely, when the camera 10 is to be again connected with the tripod 16, the bar 22 may be slipped in place into the groove 20 and locked against longitudinal movement by pressing the lever 42 along the cam surface of leg 36 until roller 50 seats in one of the indentations 58. Imperfections in complemental fit between the bar 22 and the plate 18 do not prevent a tight locking fit, not only because of the resiliency of the roller 50, but because of the provision of a number of the indentations 58 therefor.

The dove-tail cross-sectional configurations of bar 22 and groove 20 prohibit upward movement of the camera 10 relative to the tripod 16, and the way in which the longitudinal edges of the bar 22, as well as of the groove 20 converge as one end thereof is approached, permits wedging of the bar 22 in place prior to locking of the lever 42.

Details of construction may vary within the spirit of the present invention and, therefore, it is desired to be limited only by the scope of the appended claims.

Having thus described the invention what is claimed as new and desired to be secured by Letters Patent is:

1. A head for mounting a camera on a tripod comprising an elongated spring plate having a longitudinal, wedge-shaped groove in one face thereof, progressively increasing in width as one end of the plate is approached, said groove being transversely dovetailed; means for fastening the plate to a tripod; a bar, complemental to said groove and wedged therewithin; means for fastening the bar to a camera, said plate having a transverse groove in the opposite face thereof and a slit extending inwardly from the opposite end of the plate longitudinally thereof between said grooves, presenting a pair of legs; an elongated lever in said transverse groove; pivot means mounting the lever on one of said legs for swinging movement toward and away from said one end of the plate, the other of said legs having an outermost, longitudinal cam surface; and a projection on said lever provided with a resilient roller overlapping said surface and engageable therewith as the lever is swung toward said one end of the plate for squeezing said legs tightly against the bar.

2. A head for mounting a camera on a tripod comprising an elongated spring plate having a longitudinal, wedge-shaped groove in one face thereof, progressively increasing in width as one end of the plate is approached, said groove being transversely dovetailed; means for fastening the plate to a tripod; a bar, complemental to said groove and wedged therewithin; means for fastening the bar to a camera, said plate having a transverse groove in the opposite face thereof and a slit extending inwardly from the opposite end of the plate longitudinally thereof between said grooves, presenting a pair of legs; an elongated lever in said transverse groove; pivot means mounting the lever on one of said legs for swinging movement toward and away from said one end of the plate, the other of said legs having an outermost, longitudinal cam surface; and a projection on said lever provided with a resilient roller overlapping said surface and engageable therewith as the lever is swung toward said one end of the plate for squeezing said legs tightly against the bar, said surface being provided with a plurality of roller-receiving indentations.

References Cited in the file of this patent

UNITED STATES PATENTS

| | | |
|---|---|---|
| 762,070 | Longard | June 7, 1904 |
| 1,805,654 | Dehn | May 19, 1931 |
| 2,029,230 | Getz | Jan. 28, 1936 |
| 2,236,439 | McKenna | Mar. 25, 1941 |
| 2,351,386 | Zucker | June 13, 1944 |